INVENTOR.
JOHN B. CHAPLIN
BY
Bean, Brooke, Buckley & Bean
ATTORNEYS

INVENTOR.
JOHN B. CHAPLIN
BY
Bean, Brooks, Buckley & Bean
ATTORNEYS

United States Patent Office 3,334,701
Patented Aug. 8, 1967

3,334,701
GROUND EFFECT VEHICLE
John Bradley Chaplin, Williamsville, N.Y., assignor to
Bell Aerospace Corporation, Wheatfield, N.Y.
Filed Aug. 2, 1965, Ser. No. 476,370
3 Claims. (Cl. 180—7)

ABSTRACT OF THE DISCLOSURE

A ground effect vehicle having a platform subtended by a continuous flexible skirt wherein the rearward or aft portion of the skirt has a smaller depth measurement than the forward or bow portion of the skirt to permit said vehicle to avoid maneuver interference and skirt damage problems.

---

This invention relates to so-called "ground-effect" vehicles for travel, while being supported by cushions of pressured gas (such as air), over land and/or water or like surfaces.

In such vehicles "flexible skirts" are commonly employed to depend from the periphery of the rigid structure or "hull" of the vehicle to assist in maintaining the compressed gas in cushion form under the vehicle which reacts with the supporting surface, thereby levitating the vehicle into friction-free relation above the surface. When traversing rough terrain (or rough water) however, the rear wall portions of such skirt devices often engage and become entangled with terrain projections or high waves thereby interfering with maneuvering of the vehicle, and subjecting the skirts to rigorous wear and tearing stresses. Hence, maintenance of the skirt structures in effective condition becomes a serious and expensive, if not prohibitive, problem.

It is a primary object of the present invention to provide in such vehicles an improved form of flexible skirt device, whereby to avoid the maneuver-interference and skirt-damage problems referred to hereinabove.

Another object is to provide an improved skirt device as aforesaid which operates also to contribute to an improved vehicle propulsion technique.

Other objects and advantages of the invention will appear from the specification herein and the accompanying drawing wherein.

Figure 1:
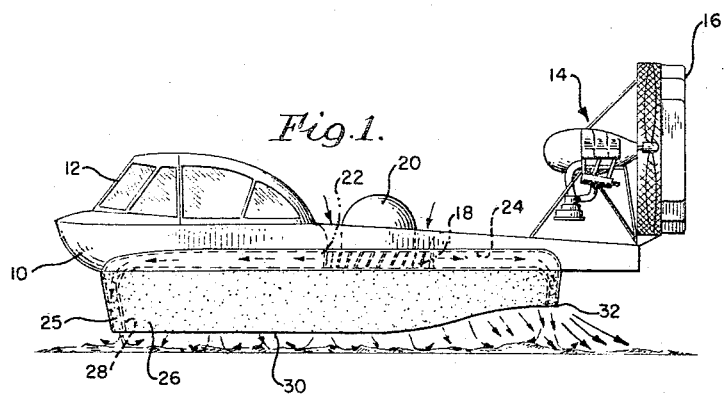
FIG. 1 is a side elevational view of a peripheral jet type ground effect vehicle embodying a flexible skirt arrangement of the present invention.
Figure 2:
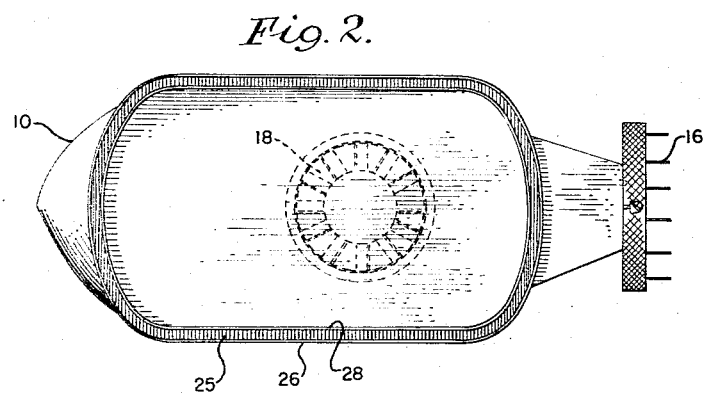
FIG. 2 is a bottom plan view of the machine of FIG. 1.
Figure 3:
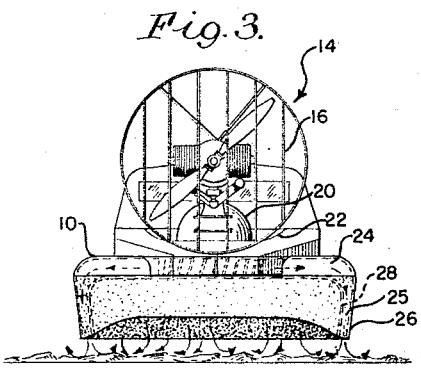
FIG. 3 is a rear end view thereof.
Figure 6:
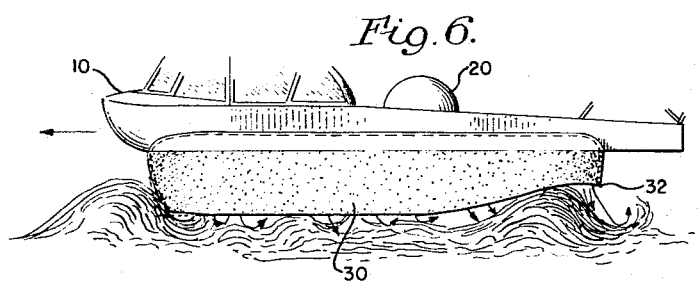
FIG. 6 is a side elevational view of a "plenum chamber" type machine embodying the improved skirt arrangement of the present invention, illustrating how the vehicle may traverse a rough water surface without "hanging-up" on the waves and/or scooping up water inside the skirt.
Figure 7:
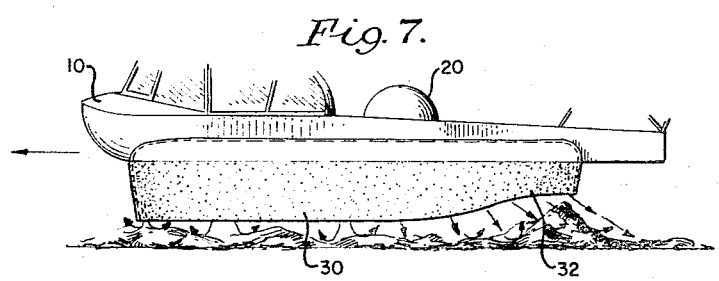
FIG. 7 illustrates how the machine of FIG. 6 traverses a rough land surface with improved facility.
Figure 8:
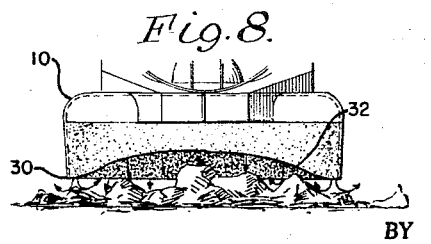
FIG. 8 is a rear end view of the machine in operation as illustrated by FIG. 7.

It will be noted that the present invention is illustrated in FIGS. 1–3 in conjunction with a "peripheral jet" type ground effect machine, while in FIGS. 6–8 it is shown in conjunction with the plenum chamber type machine. Thus, it will be appreciated that the invention is applicable to any type ground effect machine employing a flexible skirt for assisting in the creation and maintenance of a supporting cushion of gas between the rigid body portion of the machine and the reaction surface. In FIGS. 1–3, the machine comprises generally a rigid hull 10 mounting a passenger cabin 12, and an empennage including a propulsion fan and motor unit 14, and a rudder system 16. The hull carries a downwardly directed "lift fan" or compressor 18 which may be driven in any preferred manner, such as for example by an engine housed within a cowling 20 disposed within the air duct 22 which houses the fan 18 so as to streamline the hub of the latter. The duct 22 is shaped so as to deliver the discharge of the fan 18 into a manifold 24 which in turn delivers the compressed air through a downwardly directed nozzle system 25 defined by a pair of parallel and concentrically related skirts 26–28. The skirts 26, 28 are fabricated of any suitable flexible, substantially air-tight material; such as for example, any sheet or fabric which may or may not be impregnated or coated with rubber, plastic, or the like. The skirt walls 26, 28 may be interconnected by any form of cross-tie devices such as webs of fabric, so as to maintain them in generally parallel relation, thereby defining an annular duct as best shown in FIG. 2 through which compressed air discharges downwardly against the reaction surface as shown in FIGS. 1, 3.

Figure 4:
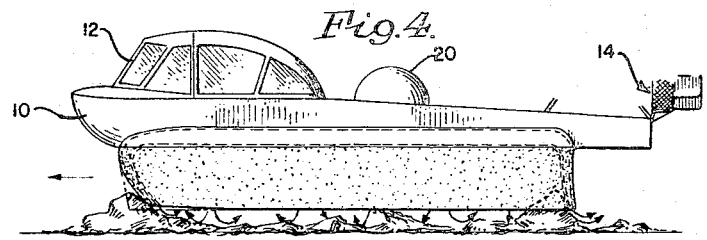
FIG. 4 is a view corresponding to FIG. 1 but illustrating how a machine equipped with a prior art type of skirt device tends to "hang-up" on terrain projections at the rear end of the skirt.
Figure 5:
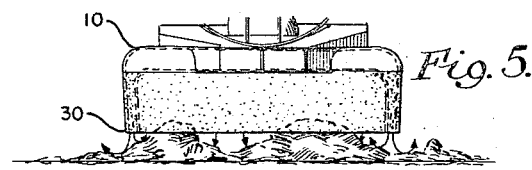
FIG. 5 is a rear end view of the machine of FIG. 4.

Whereas, in the case of the prior art the side view bottom edge profile of the skirt structure is typically of straight line form as shown in FIGS. 4, 5, in the case of the present invention the skirt structure is tailored so that at its rear end the side view profile thereof slopes upwardly from a full depth skirt form as indicated at 30 into an upwardly sloping and substantially shorter skirt form 32 extending across the rear end thereof. By virtue of this arrangement the machine is enabled to navigate relative to rough land and/or water surfaces with much greater facility than in the case of machines equipped with skirt structures of the type shown in FIGS. 4, 5. By reason of the annular wall form of such skirt devices, their front end portions are naturally free to deform inwardly and bend upwardly inside the air cushion chamber whenever an upstanding obstacle is encountered (FIGS. 4, 6). The front end of the skirt simply wipes up and over the obstacle and then later returns to its normal vertical wall attitude in response to the air pressure forces interiorly thereof.

However, in the case of the prior art, as shown by way of examples at FIGS. 4, 5, whenever the rear end wall portion of the skirt structure encounters any such land obstacle or water wave it cannot deform further rearwardly so as to skid over the obstacle because of the girthwise tension forces in the skirt fabric. Hence the machine "snags" on the obstacle, thereby interfering with the intended maneuvering of the machine and at the same time subjecting the skirt structure to excessive damaging stresses. However, as shown at FIGS. 1, 3, 6, 7, 8, in the case of the present invention the rear end of the skirt structure, being upwardly relieved as explained hereinabove, simply clears such obstructions. This is because any obstacle being successfully surmounted by the front end portion of the skirt structure will usually be of a vertical extent (above the datum level) of not more than say 50% of the vertical length of the skirt structure. Hence, if the vertical relief cut into the rear end of the skirt structure is of the same order, the necessary clearance exists.

The degree to which vertical relief is preferably tailored into the aft end of the skirt structure will usually depend somewhat on the size of the machine and upon the type of terrain expected to be encountered when operating. For example, it has been observed that in the case of rather small machines (say 4–6 passengers) it may be feasible to cut the aft end of the skirt up to approximately 50% of the depth of the forward end portion of the skirt; whereas in the case of much larger machines having skirts of the order of 10–12 ft. depth a lesser degree of vertical relief of the skirt aft end portion will be found to be more feasible and will provide a more efficient overall operation. Also, if the machine is to be operated over rough terrain or open seas, the skirt depth relief at the aft end portion thereof may profitably be as much as 50%, while if the machine is to operate over smooth terrain or sheltered waters, the skirt length reduction might more profitably be of the order of say 10%, or even less.

FIGS. 1, 6, 7 illustrate how the shorter rear end skirt form contributes to propulsion of the machine. Because of the greater air gap dimension under the skirt at the rear end of the machine, a thrust resultant driving the machine forwardly is generated. Hence, the lift fan air "loss" due to the provision of the larger air gap at the rear end of the machine is recovered, at least to a substantial degree in terms of total horsepower expended, by augmentation of the thrust output of the propulsion unit 14. FIGS. 6–8 illustrate application of the present invention to the "plenum chamber" type ground effect machine. As is well known in the art, in this type machine the lift fan mechanism is arranged to pump air directly downwardly into a hollow space under the hull, and therefore only a single outer skirt device 26 is required.

Previously, several attempts have been made to devise suitable arrangements for meeting the hereinabove stated problem, but without satisfactory results. For example, it has been proposed to provide an arrangement of cables and pulleys, whereby portions of the skirt may be temporarily lifted out of interference with projecting obstacles (French Patent 1,310,483). Another proposal involved the provision of a split skirt encircled by elastic tension members designed to permit the skirt to pull away temporarily and thereby slip over and escape from snags or the like. Still another proposal was to provide the skirts at their bottom edges with an appendage so flaccid as to have no shape retaining characteristics; but all of these proposals were found to be practically ineffective and extremely disadvantageous for various reasons, and therefore impracticable.

The skirt configuration of the present invention facilitates a maneuvering control technique of novel form. This is because of the dihedral angular relationship of the bottom edges of the skirt structure fore and aft of the approximate longitudinal center of the craft, when considered in side view. It will be appreciated that under normal operating conditions the craft will tend to see-saw about a pitch axis located over the apex of the dihedrally related skirt edge portions, which will be approximately at or behind the longitudinal center of the craft, so as to equalize the pressures on the air escaping from under the fore and aft ends of the craft. However, when the craft is moving forwardly at a substantial speed, the dynamic air pressure differential operative against the front and rear end portions of the skirt structure induces a greater flow of lift air out from under the rear end of the machine than from under the front end thereof. Accordingly, a greater volume of air now finds escape from under the rear end of the machine, and this operates not only to augment the propulsion effect, but also tends to pitch the craft into the level attitude thereof as illustrated for example a FIGS. 1, 6, 7. Hence the rear wall of the skirt structure is now disposed at a somewhat higher elevation, thereby enabling it to clear obstacles without snagging thereon, and consequently resulting in reduced skirt wear and tear.

It will of course be appreciated that although only a few forms of the invention have been illustrated and described herein, various changes may be made therein without departing from the spirit of the invention or the scope of the following claims.

I claim:

1. In a ground effect machine of the type which includes a base subtended by a flexible skirt having a bow portion, an aft end portion and two side portions defining a continuous lower marginal edge and which encloses a pressurized fluid disposed between said base and a surface over which said machine is operating for supporting said machine in vertically spaced relation from said surface, the improvement comprising, the entire lower marginal edge portion defined by said aft portion of said skirt having a depth less than the depth of the lower marginal edge portion defined by said bow portion of said skirt to avoid maneuver interference problems in the operation of said ground effect machine, and wherein, said side portions of said skirt are provided with forward portions defining portions of said lower marginal edge which are of substantially the same depth as the lower marginal edge portions defined by said bow portion, said side portions of said skirt having rearward lower marginal edge portions sloping upwardly and rearwardly from said forward portions to said aft portions of said shaft.

2. In a ground effect machine of the type which includes a base subtended by a flexible skirt having a bow portion, an aft end portion and two side portions defining a continuous lower marginal edge and which encloses a pressurized fluid disposed between said base and a surface over which said machine is operating for supporting said machine in vertically spaced relation from said surface, the improvement comprising, the entire lower marginal edge portion defined by said aft portion of said skirt having a depth ranging between 10% to 90% of the depth of the lower marginal edge portion defined by said bow portion of said skirt, said side portions of said skirt having forward portions defining portions of said lower marginal edge which are of substantially the same depth as the lower marginal edge portions defined by said bow portion, said side portions of said skirt having rearward lower marginal edge portions sloping upwardly and rearwardly from said forward portions to said aft portion of said skirt.

3. The machine as defined in claim 2 wherein,
said forward portions of said skirt extend slightly aft of the longitudinal centers of said side portions of said skirt.

References Cited

UNITED STATES PATENTS

| | | | |
|---|---|---|---|
| 3,177,959 | 4/1965 | Gaska | 180—7 |
| 3,291,240 | 12/1966 | Driver | 180—7 |

A. HARRY LEVY, *Primary Examiner.*